Figure 1:
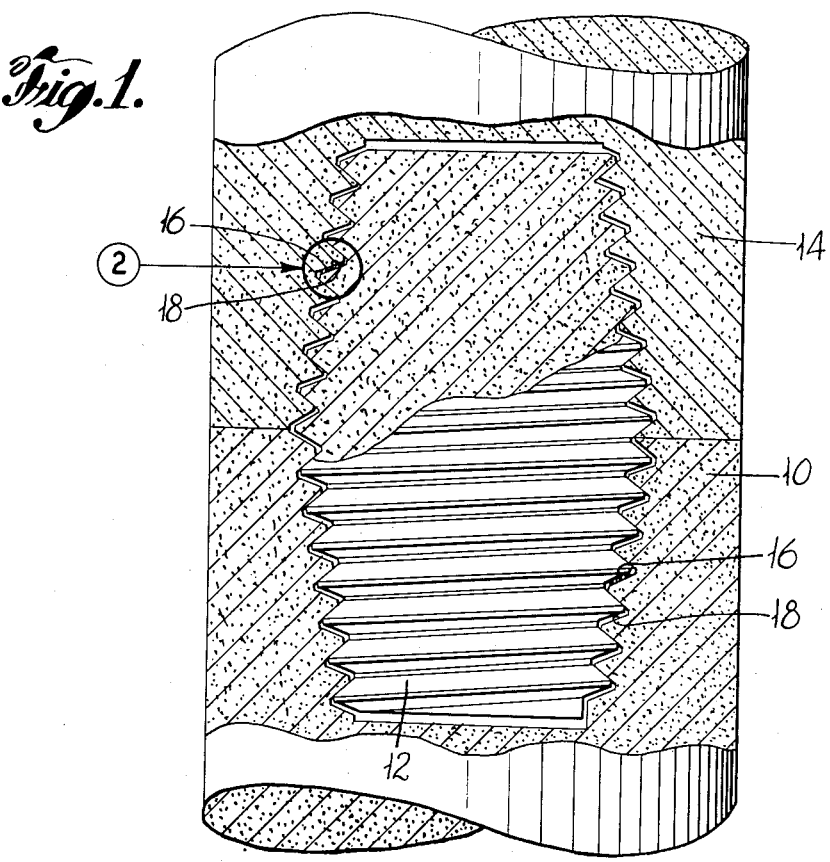

Feb. 7, 1961 H. V. JOHNSON 2,970,854
ELECTRODE JOINT
Filed Aug. 6, 1958

INVENTOR
HARRY V. JOHNSON
BY
John F. Hehmann
ATTORNEY

United States Patent Office 2,970,854
Patented Feb. 7, 1961

2,970,854

ELECTRODE JOINT

Harry V. Johnson, Niagara Falls, N.Y., assignor to Union Carbide Corporation, a corporation of New York Filed Aug. 6, 1958, Ser. No. 753,480

5 Claims. (Cl. 287—127)

This invention relates to electrode joints and it more particularly relates to a means of distributing thread clearance throughout an electrode joint.

Graphite electrodes, such as those used in electric furnaces and like equipment, are consumed in use and must be continuously fed into the furnace or other equipment where they are used. In order to facilitate this continuous feed, the electrode sections are suitably bored and threaded at each end to provide juncture means through a nipple. In this manner, a new electrode is joined to the one being consumed by inserting a nipple into the bore of either the new or consumed electrode and joining the composite electrode-nipple to the other electrode section. While nipples and their corresponding bore holes may have threaded sides which are parallel to the nipple axis, it has been found advantageous to taper the nipple so that the largest diameter is at the point of contact between the electrode sections. The nipple is screwed into place with the small diameter end going furthest into the electrode body. In threading the tapered nipples for use in joining electrode sections, the thread depth is the same whether measured at the small diameter ends or at the large diameter center, and generally, a line perpendicular to the center axis of the nipple would bisect the thread included angle. It is usual that each thread consists of loaded flank, which is usually nearer the geometric center of the nipple, and an idle flank which is opposite to the loaded flank. The loaded flank generally carries most, if not all, the compressive stress between the nipple and the electrode sections.

In this type of joint, the half that is assembled first usually contains no clearance at the idle flank while maximum clearance occurs at the idle flank of the second half assembled.

There has been a long felt need to more evenly distribute this maximum clearance in order to reduce thermal stresses which build up due to lack of expansion room and result in cracking of the joint. In the past, various methods have been proposed to accomplish substantially even distribution, among the most prominent being the incorporation of plastic buttons on the ends of the nipple; however, variance in electrode socket depth and nipple length necessitated individual measurements of each unit to be assembled. This was a time consuming operation and not readily adapted to standardization of parts to be used in conjunction with any nipple or socket.

Another proposed solution to this problem encompassed a flange at the geometric middle of the nipple which would fit into corresponding counter bores in the socket faces. This method required a larger nipple stock size and greater machining losses when the flange and threads were cut. Further, there was a loss in mechanical strength which accompanied the use of the flange.

It is therefore a most important object of this invention to reduce thermal stress occurring in the nipple and electrode section caused by forces between them.

It is another object of this invention to substantially evenly distribute thread clearance throughout the entire electrode joint.

It is a further object of this invention to increase the bearing surface of the loaded flanks of the second half of the joint assembled to more evenly distribute bearing stress and improve current carrying contact surface.

Figure 2:
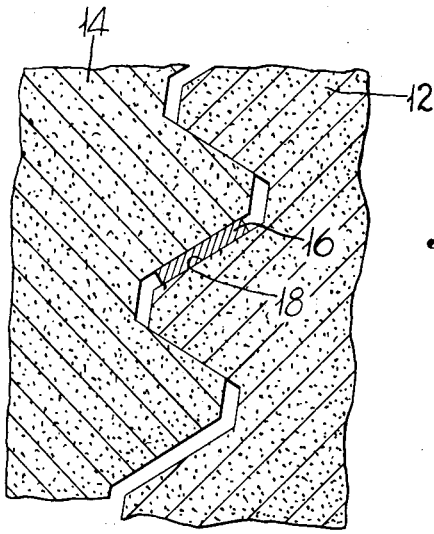

The invention will be best understood with reference to the accompanying drawing in which:

Fig. 1 is a vertical section through nipple-joined-electrode sections incorporating this invention; and Fig. 2 is an enlarged view of the section 2 in Fig. 1.

Broadly, this invention comprises the use of one or more fusible or shrinkable shims between the nipple and electrode section threads of an electrode joint so as to distribute clearance between the threads. It has been found that the incorporation of a shim between the idle flanks of the threads of the nipple and the electrode section provides space, after the shim has melted, for the idle flanks to move closer together as a result of thermal expansion thereby making the fit somewhat yieldable in order to compensate for uneven dimension variation due to heating while in service. This means that expansion which accompanies heating of the electrode while in use will not cause stresses to build up between the nipple and the electrode section which may cause cracking or fracture of either the nipple or the section or both. As the electrode joint is heated, the shim will fuse or in some other manner reduce its thickness thus allowing more room for the threads to expand. A further desirable advantage in the use of a shim is that the space between the threads is more evenly distributed over the whole nipple length. This means that the threads between the nipple and the first screwed on electrode section are given more space therebetween and that there is a reduction in excess space between the nipple and second screwed on electrode section threads thus providing a greater area of contact therebetween and a proportionate increase in the bearing surface available on the thread flanks.

More particularly and with reference to the accompanying drawing, a joint incorporating this invention is composed of a lower electrode section 10, a nipple 12 seated therein and connecting the lower electrode section 10 to an upper electrode section 14. Suitably, the nipple 12 may be conventionally made or it may be one of the newer types, as for example that shown in U.S. Patent No. 2,735,705. At least one shim 16 (the drawing shows only one on each end for simplicity), made of a fusible or shrinkable material, is incorporated on the idle flank 18 of a thread in order to distribute the clearance between socket thread and nipple thread thereby allowing room for thermal expansion of the nipple within the socket and also securing approximately even bite between threads joined to the lower electrode section 10 and threads joined to the upper electrode section 14. It is to be stressed, that if the shim 16 is not used, as in conventional practice, there is complete or very nearly complete contact between the nipple threads and the first screwed on electrode section. This results in almost no clearance there and entirely too much clearance between the nipple and the second screwed on electrode section. Further, the area of loaded flank contacting the thread of the second electrode section assembled is greatly increased when a shim is incorporated in the joint as shown in Fig. 1.

The proper shim thickness is equivalent to or greater than the maximum tightening tendency of the idle flank when the temperature changes from the assembly temperature to operating temperatures. The maximum tightening tendency of the idle flanks usually occurs at the end thread of the nipple and the shim should be placed at or near this maximum point. The tightening tendency should be calculated at several distances from the electrode end faces in order to be certain of the location and magnitude of the maximum.

Assuming that expansion takes place equally in all directions radially from the axis and also equally upward and downward from the face planes of the electrode ends, the component of expansion perpendicular to the idle flank is found from the sum of four products as follows:

Socket longitudinally $= -d \times \Delta T \times (Ko + \Delta K) \times \cos \theta$
Nipple longitudinally $= d \times \Delta T \times (Ko + \Delta K) \times \cos \theta$
Socket transversely $= -r \times \Delta T \times (Ko + \Delta K) \times \sin \theta$
Nipple transversely $= r \times \Delta T \times (Ko + \Delta K) \times \sin \theta$ where $d$ = distance from the electrode face plane to the thread flank in question.
$r$ = radius of nipple at the thread flank in question.
$\Delta T$ = increase in temperature. (Socket and nipple are different.)
$Ko$ = coefficient of thermal expansion of socket or nipple and in proper direction.
$\Delta K$ = increase of coefficient due to temperature rise.
$\theta$ = angle between idle flank and a radius line.

Having made the four calculations according to the above formulas, longitudinal tightening tendency and transverse tightening tendency for both the nipple and electrode section (socket), the results are added to give the maximum tightening tendency of the idle flank from which the shim thickness is derived.

Tests were conducted on a connection made up of two 20 inch by 72 inch electrode sections joined by a 10¾ inch by 14 inch nipple. Calculations based upon the above noted equations were made for these joints operating at a temperature of 1500° C. (electrode) and 1600° C. (nipple) and a theoretical shim thickness of 0.0063 inch was determined, from which an actual shim thickness of 0.007 inch was chosen. The width, length and number of shims are not critical except that they should give uniform clearance around the idle flank. A shim width found suitable was about the same as the width of the idle flank, which for a thread having a pitch of 0.333 inch was 0.212 inch. However, shims having a width as small as 0.106 inch have performed satisfactorily on 0.333 inch pitch threads. Suitably, the shim or shims may be continuous and fully cover the nipple or socket thread idle flank or there may be three shims each ¼ inch long distributed evenly around the nipple or socket periphery. Preferably six shims are used, each 1 inch long, distributed at 120° intervals on the two adjacent idle flanks of the socket or nipple. While it is practical to place the shims at any desired location along the periphery, it has been found to be advantageous to place them near the location of maximum tightening tendency which is usually near the end of the nipple.

In order to facilitate easy handling in the assembly of electrodes for use in furnaces, the nipple of this invention may conveniently be provided with shims near both ends so as to make it symmetrical. When the shims are so placed, either end may be inserted into the electrode section first joined. Though it is convenient to thus position the shims, it is not at all necessary as shims on one end of the joint will serve the intended purpose if that end is the first joined.

The shim may be made of any material, for example, metal, alloy, plastic, or fibre, which will reduce its thickness at high temperatures and such shim may be applied to the idle flank by any of several well known means such as spraying, painting, plating, riveting, or cementing strips of the proper thickness. Preferably, a strip of zinc-aluminum alloy, having a melting point of about 400° C. and the proper thickness, is used since it will remain in a warm half-joint until the other half is assembled however, various other materials having similar properties may be used to advantage as shims.

In disclosing the specific electrode and nipple size in the above illustrative example, it is not meant that this invention is to be limited to those specific sizes since it will be obvious that similar calculations may be made for any size electrode and the proper shim thickness determined for them.

What is claimed is:

1. In an electrode joint comprising two threaded electrode sections and a threaded nipple connecting said sections; the improved construction comprising the incorporation of at least one shrinkable shim between the threads of said nipple and the threads of at least one of said electrode sections, said shim prior to shrinking thereof providing substantially even distribution of clearance between said threaded nipple and said threaded electrode section, and thereby providing room for thermal expansion of said threads.

2. In a tapered electrode joint comprising two electrode sections having tapered threaded recesses in the ends thereof and a tapered threaded nipple connecting said sections, said nipple thread having an idle flank generally facing the ends of said nipple; the improved construction comprising the incorporation of at least one shrinkable zinc-aluminum alloy shim adjacent said idle flank between said nipple and at least one of said electrode sections, said shim prior to fusion thereof providing substantially even distribution of clearance between said threaded nipple and said threaded electrode section, and thereby providing room for thermal expansion thereof.

3. An electrode joint comprising two electrode sections having threaded tapered recesses in the ends thereof joined by a tapered nipple having threads corresponding to said threaded electrode sections, said threads being perpendicular to the center line of said nipple, and at least one fusible shim between the threads of said nipple and the threads of said electrode sections, said shim prior to fusion thereof providing substantially even distribution of clearance between said threaded nipple and said threaded electrode section, and thereby providing room for thermal expansion of said threads.

4. An electrode joint comprising two electrode sections having threaded tapered recesses in the ends thereof joined by a tapered nipple having threads corresponding to said threaded electrode sections, said threads being perpendicular to the center line of said nipple, said nipple thread having an idle flank generally facing an end thereof, and at least one shrinkable shim adjacent said idle flank between the threads of said nipple and the threads of said electrode sections, said shim prior to shrinking thereof providing substantially even distribution of clearance between said threaded nipple and said threaded electrode section, and thereby providing room for thermal expansion of said threads.

5. An electrode joint comprising two electrode sections having threaded tapered recesses in the ends thereof joined by a tapered nipple having threads corresponding to said threaded electrode sections, said threads being perpendicular to the center line of said nipple, said nipple threads having an idle flank generally facing an end thereof, and at least one shrinkable zinc-aluminum alloy shim adjacent said idle flank between the threads of said nipple and the threads of at least one of said electrode sections, said shim prior to shrinking thereof providing substantially even distribution of clearance between said threaded nipple and said threaded electrode section, and thereby providing room for thermal expansion of said threads.

References Cited in the file of this patent

UNITED STATES PATENTS

| | | |
|---|---|---|
| 1,368,087 | Woodward | Feb. 8, 1921 |
| 1,686,474 | Soderberg | Oct. 2, 1928 |
| 2,122,915 | Olson | July 5, 1938 |
| 2,145,168 | Flagg | Jan. 24, 1939 |
| 2,399,526 | Warren | Apr. 30, 1946 |
| 2,735,705 | Johnson et al. | Feb. 21, 1956 |
| 2,810,117 | Abbott | Oct. 15, 1957 |